Sept. 20, 1971  F. COATTI  3,605,806

SLIDE VALVE WITH A CORRELATED RELIEF VALVE

Filed Feb. 17, 1970

INVENTOR:

FRANCESCO COATTI

United States Patent Office 3,605,806
Patented Sept. 20, 1971

3,605,806
SLIDE VALVE WITH A CORRELATED RELIEF VALVE
Francesco Coatti, Montorio, Italy, assignor to M.I.T.A. Macchine Infilzatrici Tabacco Automatiche S.a.r.l., Verona, Italy
Filed Feb. 17, 1970, Ser. No. 12,110
Claims priority, application France, Feb. 26, 1969, 61,218/69
Int. Cl. F16k *11/18*
U.S. Cl. 137—596.13                  4 Claims

ABSTRACT OF THE DISCLOSURE

A device for distributing fluids at high pressure, to a number of consumer devices each having an inlet and an exhaust, has a distributor body with a feed passage for connection to the source of fluid, and an exhaust passage. Means are provided for connection of the feed and exhaust passages to the consumer devices, and a corresponding number of valves in the distributor body serve to connect the feed and exhaust passages selectively to the respective consumer devices. A communication is provided directly between the feed passage and the exhaust passage, and an auxiliary valve therein is associated with the plurality of valves so that said auxiliary valve is closed when any one of the plurality of valves is actuated.

---

The present invention has for its object the provision of an improved device for distributing at pressure a liquid or gaseous fluid, coming from a single generator, to one or several consumer devices, each with one or two chambers, to be fed with the liquid under pressure or to be exhausted.

The device has as many control rods as there are consumer devices to be fed through the distributor. Each control rod of the device can have three main positions, apart from intermediate positions, and these are a rest position in which there is no movement of fluid in the openings of the consumer devices, and two working positions in which the fluid flows in one opening and leaves from the other.

A valve on an auxiliary pipe which carries the fluid under pressure from the feeding pipe directly to the discharge is automatically closed when one of the control rods of the device is moved.

The device is particularly suitable for controlling hydraulic or oleodynamic jacks and engines, particularly on machines used for moving earth and more generally for controlling any hydraulic or oleodynamic consumer device.

For some time distributors of fluid at pressure having the same aims as those above mentioned have been in use. In these, various elements of the distributor, each consisting of a small block, are connected to each other by connecting rods and packings which secure the retention of the fluid and are inserted in order to ensure the passage of the fluid between the levels of reciprocal contact of the said distributor elements.

These packings generate a hydrostatic force which bears on the section of the pipe and on the bottom of the packings themselves, inducing deformations in the connecting-rods which keep the various elements connected, as well as on the structure of the elements themselves.

This latter deformation brings the disadvantage of locking the rods in the distributor.

Recent improvements have permitted the obtaining of various sections of the distributor made of monolithic bodies such as cast-iron or steel, which when they are hollowed out internally have the necessary passages for fluid distribution.

These also have not inconsiderable disadvantages, since it is almost impossible to keep them clean and also there are a large number of metal seals, which have had to be produced to secure the required distribution.

Moreover these devices have distributor rods of large diameter, in order to eliminate the need for any pipes within the body of the device.

With the adoption of the present invention, it is possible to hollow out the passages for the fluid directly from solid rods of metal or non-metal material and it is possible to reduce the distributor rods to very small diameters, retaining in the meantime low load losses in the fluid to be distributed.

This permits one to secure high volumetric outputs and a notable easing in the movements of the distributor rods even at very high pressure, and even although the sections of the rods themselves are much smaller.

Other features of the invention will be apparent from the detailed description which follows, with reference to the accompanying drawing, in which one embodiment of the invention is illustrated, as a non-limitative example.

The distributor includes a body 1 within which are positioned transversal housings for the control rods 2 of a distributor, one rod being provided for each double effect cylinder of the distributor.

Figure 1:
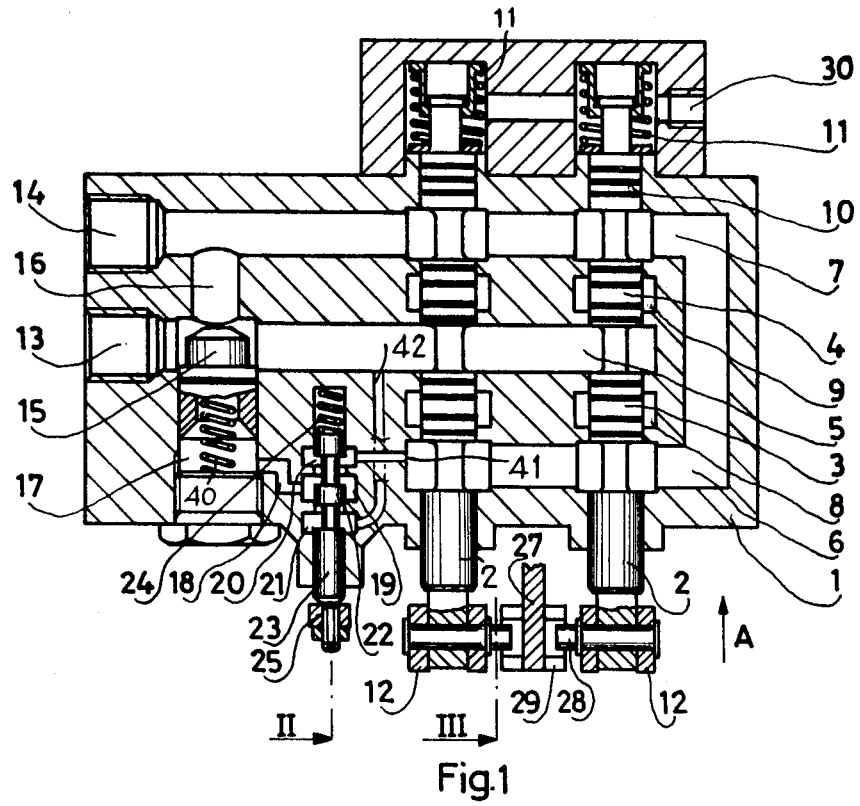
FIG. 1 is a longitudinal section of a distributor.

In FIG. 1 the rods 2 are two in number but they could be any number which must always however be the same as the number of consumer devices.

Each rod 2 controls the small valve plungers 3 and 4, which can move around their own axis, opening or closing the connections between the central feed passage 5, the lateral discharge passages 6 and 7 and the chambers 8 and 9 which feed the corresponding chambers of the or each consumer device.

Each control rod 2 has a small retention plunger 10 as well as a restoring spring 11 which opposes the impulse given by a control lever 12, and the chamber containing the spring 11 is connected with the discharge by means of a port 30.

It is clear that a movement of the control rod 2 in the direction of the arrow A will cause opening of the passage between the central passage 5 and the chamber 9 as well as between the discharge passage 6 and the chamber 8; this will supply with fluid under pressure the chamber of the consumer device connected to the chamber 9, and will connect the other chamber of the device, via the chamber 8, to the discharge.

A movement in the direction opposite to that of the arrow A will cause the opening of the passage for the fluid from the central passage 5 to the chamber 8 and the connection of the chamber 9 to the discharge passage 7; this will allow the chamber of the consumer device which is connected to the chamber 8 to be put under pressure, and the other chamber of the device to be allowed to discharge.

The central passage 5 is connected via the opening 13 to the generator of fluid under pressure, whilst the passages 6 and 7 are connected via the opening, 14 to the discharge.

The relief valve 15 closes the passage 16 which directly connects the feed opening 13 with the discharge opening 14 when the force of the spring 40 in the chamber 17 with the pressure in the chamber overcomes the pressures in the passages 5 and 7 acting on the valve 15 in an obvious manner. Thus, with the inlet pressure in the chamber 17 the valve 15 will close and with discharge pressure therein, both as next described, the valve 15 will open. This happens because of the imbalance produced by the spring 40, in the first instance and the imbalance of the pressures overcoming the spring 40 in the second instance.

The chamber 17, which is in front of the valve 15, is fed through the passage 18 from the chamber 19 which can be put in communication with the discharge through the chamber 20 via the passage 41 or with the feed opening through the chamber 21 via the passage 42, depending on the position of the small plunger or auxiliary valve 22 which is actuated by the rod 23 which counters the restoring spring 24.

In the first case with inlet pressure on one side of the valve 13 and discharge pressure on the other (as shown in FIG. 1) the valve 15 will be open, whilst in the second with inlet pressure on both sides of the valve 15 will be closed by the imbalance of the spring 40.

Figures 2, 3:
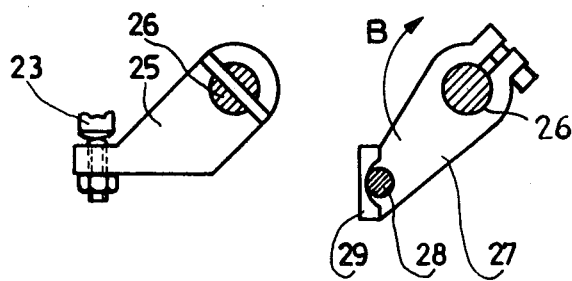
FIG. 2 shows a detail of a control lever of a valve opening for direct passage of fluid to a discharge and is a section taken on line II of FIG. 1.
FIG. 3 shows a detail relating to a control lever of one of the distributor rods, and is a section taken on line III of FIG. 1.

The movement of the rod 23 is controlled by the lever 25, which is more clearly visible in FIG. 2, connected through the shaft 26, not shown in FIG. 1, to the lever 27 (FIG. 3), which rotates in the direction of the arrow B every time that any of the rods 2 is moved either in the direction indicated by the arrow A (FIG. 1) or in the contrary direction. This is due to the fact that the gudgeon pins 28 on the rods 2 strike in either direction of reciprocation against the jaw or cam 29 connected to the lever 27.

Thus it can be observed that, corresponding to each movement of a control rod 2, the rod 23 is driven inwards, against the action of the spring 24, which is the restoring force for rod 23, and causes the immediate closure of the valve 15, which otherwise remains open. The rod 23 is also forced inwardly against the action of the centering springs 11 when the rods 2 are moved but these springs have no restoring effect on the rod 23.

The fluid under pressure, entering through the feed opening 13 into the central passage 5 therefore feeds the cylinders controlled by the rods 2 whilst the valve 15 is closed.

When, on the other hand, the device is at rest, the fluid under pressure passes directly to the discharge through the open valve 15.

The closure of the valve 15 can be delayed by merely reducing the height of the small plunger 22 in relation to the height of the chamber 19 so as to permit the fluid under pressure coming from the chamber 21 to pass through the chamber 19 into the chamber 20 which is connected with the discharge, thus delaying its entry under pressure into chamber 17 which precedes valve 15.

The delay in closure of valve 15 is thus associated with the position of the rod 23 and therefore the rod 2, which is actuated at this moment.

In other words a greater movement of the rod 2 will cause a faster closure of the valve 15.

The advantages of adopting the present invention are due mainly to the presence of the auxiliary passage 16 which is closed by the valve 15 and which allows the fluid under pressure from the feed opening 13 to be taken directly to the discharge opening 14 without affecting the small plungers 3 and 4 which may consequently have fairly small diameters, without presenting great problems concerning retention of the fluid. The passage 16 is closed automatically by the valve when a pair of small plungers is set in motion by the relevant control rod, in one or the other direction.

Another advantage inherent in the use of this invention consists in the possibility of hollowing out all the passages for the fluid, as well as the places where the small control plungers move, by forming them in a monolithic block. This facilitates the construction of the block itself, which may be hollowed out from a metal bar without having recourse to casting, and thus also permits making the plungers 3 and 4 of the same material as the block 1 for the purpose of obtaining the same coefficient of thermal expansion, which enables the device to operate at very high temperatures.

By making the device in materials that resist corrosion, it is possible to use it to distribute corrosive fluids.

Other constructional variations can be made, particularly as regards the mechanical connection between the control of the rods 2 and of the rod 23, without exceeding the scope of the following claims.

I claim:
1. A device for distributing fluids at high pressure, comprising a distributor body having a feed passage for connection to a source of fluid under pressure and an exhaust passage means on said body for connection of said feed passage and said exhaust passage to at least one consumer device at least one corresponding valve in said distributor body to selectively connect said feed and exhaust passages to said consumer device, means forming a communication between said feed passage and said exhaust passage, an auxiliary valve in said communication means, and means associated with said consumer valve and with said auxiliary valve to close the latter when said consumer valve is actuated.

2. A device, as claimed in claim 1, wherein said auxiliary valve comprises a valve chamber in said body and a plunger movable in said valve chamber, the height of said plunger being less than the height of said valve chamber, thereby to provide in the action of closing of said auxiliary valve a time delay which is inversely proportional to the movement made by said plunger and thus also to the movement made by the actuated one of said valves.

3. A device, as claimed in claim 2, wherein said valve body is a monolithic block, said feed passage, said exhaust passage, said connection means, said valve, and said communication means.

4. A device, as claimed in claim 1, including more than one consumer valve, each with means to close said auxiliary valve independently of the other consumer valve.

References Cited

UNITED STATES PATENTS

| | | | |
|---|---|---|---|
| 2,847,030 | 8/1958 | McRae | 137—596.13 |
| 3,451,426 | 6/1969 | Flint | 137—596.13 |

HENRY T. KLINKSIEK, Primary Examiner

U.S. Cl. X.R.

251—263